Patented July 13, 1926.

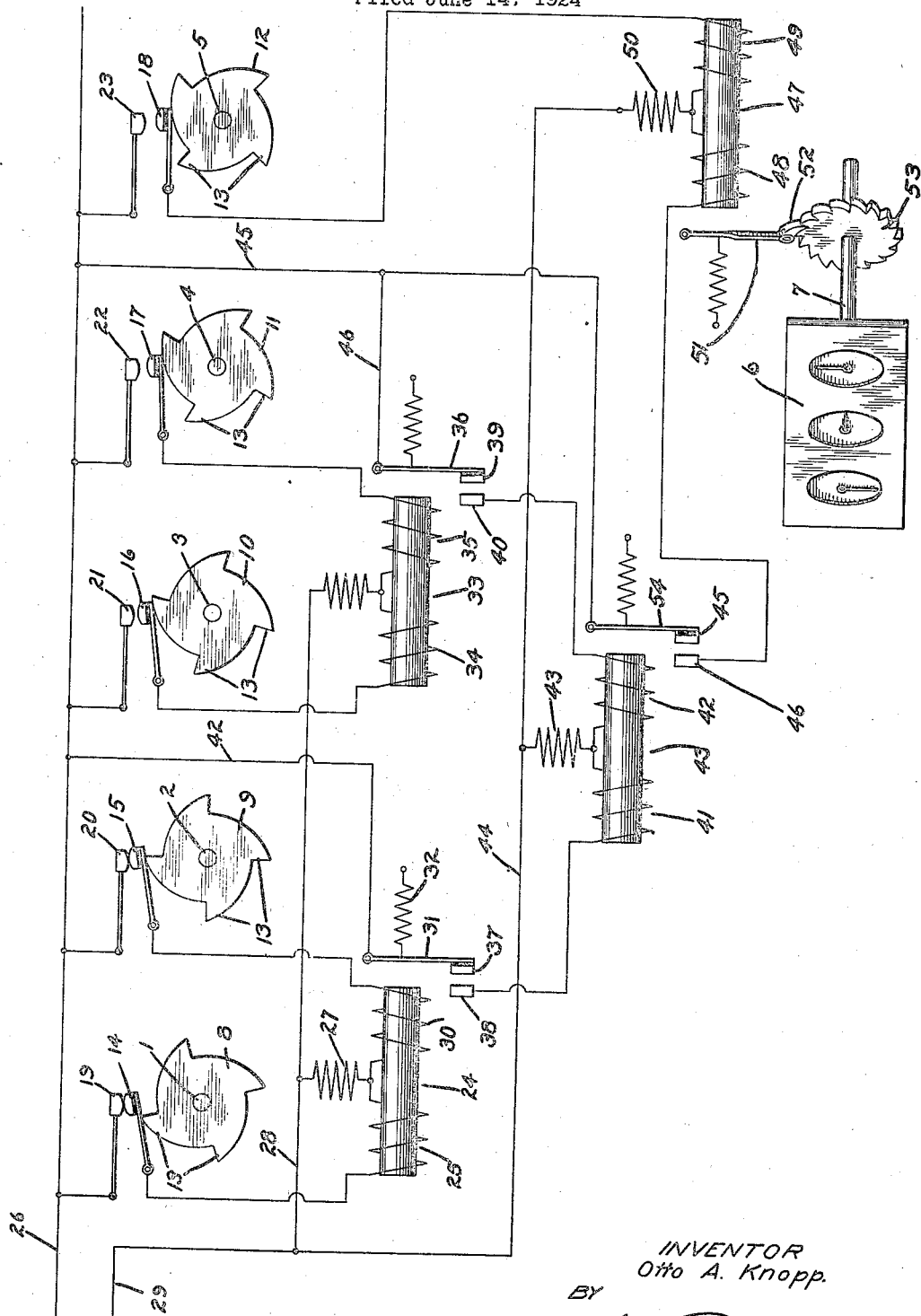

1,592,276

UNITED STATES PATENT OFFICE.

OTTO A. KNOPF, OF OAKLAND, CALIFORNIA.

MULTIPLEX REGISTER.

Application filed June 14, 1924. Serial No. 720,105.

This invention relates to a device that is capable of indicating the total movement of a plurality of devices, and more particularly to an electrically operated register that sums the total indications of a plurality of meters.

In Patent No. 1,477,367, granted Dec. 11, 1923, I describe an arrangement wherein the integrations of two meters measuring electric energy are added in a register. My present invention consists of an improvement over that arrangement, whereby it is possible to add indications of that nature, of any number of meters or the like.

My invention possesses other advantageous features, some of which with the foregoing, will be set forth at length in the following description, where I shall outline in full that form of the invention which I have selected for illustration in the drawings accompanying and forming part of the present specification. Although I have shown in the drawings but one embodiment of my invention, I do not desire to be limited thereto, since the invention as defined in the claims may be embodied in other forms also.

Referring to the drawings:

The single figure is a wiring diagram illustrating the principle of my invention.

In the present instance I show five shafts, 1, 2, 3, 4 and 5, that are adapted to be driven through angles corresponding to some quantity to be measured; for instance, such as electrical energy expended in a work circuit. Under such circumstances, the shafts 1, 2, 3, 4 and 5 are each connected to the rotating element of an integrating meter, not shown. The arrangement is such that the total combined registration of all of these meters is secured on a register 6, operated by a shaft 7. This registration is accurate within a very small limit, irrespective of such conditions as the stoppage of one or more of the shafts 1, 2, 3, 4 and 5 in any position.

Before attempting to explain in detail how this result is secured, it is advisable to discuss the conditions that make it impossible of attainment by old and well-known methods. For example, the shafts 1 to 5 could be coupled by belts or gearing in such manner as to provide a summation of their individual movements, but such a scheme would be worse than none, because the mechanical drag imposed on these shafts would render their indications highly inaccurate and worthless. The most obvious alternative perhaps is the use of an electrically operated register, the circuit of which may be completed by any one of the shafts once per rotation through a constant angle, by the aid of parallel circuits, one for each shaft. Such an arrangement might work satisfactorily for a while; but in case it should happen that two or more of the meters complete the circuit simultaneously, only one energization of the electric circuit results, and all the other impulses are lost. On the other hand, if one of the shafts should happen to be stationary in just such a position as to maintain the electric circuit energized, the rotation of the other meters can have no further effect on the register. With the aid of my invention, the chance of any inaccuracy is minimized, as will become apparent from the description now to be given.

Each of the shafts 1 to 5 is provided with a device whereby it operates contacts whenever it has completed a definite movement. For example, the wheels 8, 9, 10, 11 and 12, fastened to the shafts, may be utilized for this purpose, each having evenly spaced projections 13 which are adapted to urge movable contacts 14, 15, 16, 17 and 18 against the relatively stationary contacts 19, 20, 21, 22 and 23, for each quarter of a revolution. The contacts 14 and 19, as well as 15 and 20, which are respectively associated with shafts 1 and 2, operate upon a differential relay 24, whereby whenever one of these pairs of contacts are operated, the relay is energized independently of the condition of the other pair of contacts. Thus contacts 14 and 19 control the circuit for one coil 25, which circuit may be traced as follows: from main 26, contact 19, contact 14, coil 25, impedance device 27 (either reactive or resistive or both), lead 28, to the other main 29. Similarly, contacts 20 and 15 control the circuit for a coil 30 that is differentially wound with respect to coil 25, which circuit may be traced as follows: main 26, contact 20, contact 15, coil 30, impedance 27, lead 28 to main 29.

Relay 24 operates to attract its armature 31 against the action of a spring 32 whenever either of the sets of contacts 14, 19 or 15, 20 is changed from open to closed condition, or vice versa. Thus assuming that contacts 14, 19 close while contacts 20, 15 are open. The result is merely an energization of coil 25, and consequent attraction of armature 31 as soon as contact 14 engages contact 19; and a release of armature 31 when contact 14 is allowed to drop away from contact 19. Now let us assume that shaft 2 is stopped in such position that contacts 20 and 15 are in engagement. Under such circumstances the operation of contacts 14 and 19 still causes operation of relay 24, as will be seen from the following analysis: Before contacts 14 and 19 engage, relay 24 holds armature 31 attracted, due to continuous energization of coil 30. As soon as contacts 14 and 19 are in engagement, however, the coil 25 is also energized, and since coils 25 and 30 are in opposition, armature 31 is released. As soon as contact 14 disengages from contact 19, the armature 31 is again attracted. It is thus seen that this armature performs a cycle of operation independently of the fact that one set of contacts is in continuous engagement. The impedance device 27 is inserted in circuit in order to control the current consumption when both coils 25 and 30 are energized. This consumption would be otherwise high when an alternating current is used, due to the non-inductive character of the circuit when both coils are energized.

Now suppose that both shafts 1 and 2 rotate, and that there is a period when both sets of contacts are simultaneously in engagement. Even under such circumstances, there is almost a certainty that both impulses will be registered by the relay 24. If contacts 14 and 19 engage first, the armature 31 will be attracted due to the energization of coil 25. Then when contacts 15 and 20 become active, the armature is released, due to both coils being active. Upon one of the contacts dropping away, the armature is again attracted, and it is finally released when the second set of contacts are disengaged. It is thus seen that two cycles of operation of relay 24 are performed, and no current impulse is lost. The only possibility of error arises when both sets of contacts happen to be made or broken at exactly the same instant; but this likelihood is extremely small, and in fact on actual trial has been found to be so remote as to make it properly negligible.

In my prior patent hereinbefore referred to, the arrangement is substantially as has now been described, the armature 31 directly operating a pawl and ratchet to advance a register. However, such a device cannot be used with more than one pair of meters. In order to adapt the device to any number of meters, certain alterations must be made, which will now be described.

Another pair of shafts 3 and 4 may be similarly arranged to operate a second differential relay 33, having coils 34 and 35, and an armature 36. Armature 31 carries a contact 37 arranged to engage contact 38 whenever armature 31 is attracted. Similarly, armature 36 carries a contact 39 arranged to engage contact 40 whenever it is attracted. These two sets of contacts in turn control the circuits of coils 41 and 42 of a differential relay 43 that is similar to relays 24 and 33. Thus whenever armature 31 is attracted, relay coil 41 is energized through the following circuit:—main 26, lead 42, contacts 37 and 38, coil 41, impedance 43, lead 44, and main 29. Relay coil 42 is similarly energized when armature 36 is attracted through the following circuit:—main 26, leads 45 and 46, contacts 39 and 40, coil 42, impedance 43, lead 44, and main 29.

If only four meters be included in the system, the relay 43 would be arranged to operate the register 6 directly, or through the interposition of a magnet, controlled by contacts such as 45, 46 which are operated by relay 43. But when there are still other meters to operate the register, they may be paired off as described in connection with shafts 1, 2, 3 and 4. The result would be half the number of relays such as 24, 33, which may again be paired off to operate half the number of relays such as 43. In this manner, it is possible to keep on halving the number of relays, which finally reduces to one, operating register 6. In case an odd number of shafts are present, as indicated, the manner of reducing the ultimate control to a single relay is to combine the odd element directly with any other element of any succeeding stage; the resultant differential relay can then be treated as an element of a still more advanced stage. For example, shaft 5 operates contacts 18 and 23 which in combination with contacts 45 and 46 of relay 43, jointly control a succeeding differential relay 47. This relay has the coils 48 and 49 which are respectively controlled by contacts 45, 46 and 18, 23. A current limiting impedance 50 may also be used as with the other relays. In the present instance the register shaft 7 is operated directly by the armature 51 of relay 47, by the aid of a pawl 52, and ratchet wheel 53 fastened on shaft 7.

From the circuit diagram as disclosed, it is evident that the operation of any one of the sets of contacts associated with shafts 1, 2, 3, 4 and 5 will cause the actuation of shaft 7 by one step. For example, taking contacts 16 and 21, associated with shaft 3, these contacts when operated cause armature 36 of relay 33 to operate through a cycle of movement, and thus to move contact 39 to and from contact 40. These contacts in turn cause actuation of armature 54 of relay 43 through a cycle of operations, and thus the operation of contacts 45 and 46. Finally these contacts energize coil 48 of relay 47, which in turn reciprocates pawl 51 once. The register 6 thus shows the combined registrations of all of the meters.

It is obvious that the mode of successive pairing off the respective elements to secure finally a single relay that operates the register, may be varied considerably. No matter what the number be of elements to be totalized, it is always possible to secure this reduction; one differential relay can always be made to operate a set of contacts that is the full equivalent of two sets of contacts controlling the relay coils, and then this relay can in turn be considered as an element which may be paired with either another relay or with any other contact making element, to control still another set of contacts. Succeeding steps to reduce the sets of contacts to a single one may be readily taken.

I claim:

1. In a device for registering the combined movement of three or more elements, an electrically operated register, and means for operating the register, comprising a differentially wound electromagnet having a pair of opposed coils, and at least one differentially wound relay controlling one of the coils of said magnet, and means whereby said relay is controlled by the movement of at least some of the elements.

2. In a device for registering the combined movement of three of more elements, an electrically operated register, an electromagnet having a coil for operating the register, a differentially wound relay having contacts controlling the coil, and means whereby said relay is controlled by the movement of at least some of the elements.

3. In a device for registering the combined movement of a plurality of elements, an electrically operable register, a pair of contacts associated with each element and arranged to be operated by the movement thereof, a plurality of electromagnets each having a pair of differentially wound coils, means whereby some of these coils are controlled by the contacts, contacts operated by the electromagnets, and means whereby the contacts control the operation of the register.

4. In a device for registering the combined movement of three or more elements, contacts associated with each element and operated periodically on the completion of successive units of movement, and a plurality of relays each having a pair of differentially wound coils and a pair of contacts operated upon a change in energization of the relay, the contacts of the elements being arranged in pairs of sets to operate some of the relays, and the contacts of these relays in turn being paired to operate still other coils.

5. In a device for registering the combined movement of three or more elements, contacts associated with each element and operated periodically on the completion of successive units of movement, a plurality of relays each having a pair of differentially wound coils and a pair of contacts operated upon a change in energization of the relay, the contacts of the elements being arranged in pairs of sets to operate some of the relays, and the contacts of these relays in turn being paired to operate still other coils, associated with other relays, an electrically operable register, and means whereby said other relays operate said register.

In testimony whereof, I have hereunto set my hand.

OTTO A. KNOPP.